(12) United States Patent
Miller

(10) Patent No.: US 6,756,766 B2
(45) Date of Patent: Jun. 29, 2004

(54) AUTOCLAVABLE BATTERY PACK

(75) Inventor: David L. Miller, Joplin, MO (US)

(73) Assignee: Eagle-Pitcher Industries, Inc., Cincinnati, OH (US)

( * ) Notice: Subject to any disclaimer, the term of this patent is extended or adjusted under 35 U.S.C. 154(b) by 39 days.

(21) Appl. No.: 10/287,727

(22) Filed: Nov. 4, 2002

(65) Prior Publication Data

US 2004/0012370 A1 Jan. 22, 2004

Related U.S. Application Data

(60) Provisional application No. 60/397,292, filed on Jul. 19, 2002.

(51) Int. Cl.[7] .................................................. H02J 7/00
(52) U.S. Cl. ........................................ 320/112; 429/97
(58) Field of Search ........................ 320/112; 429/97, 429/98, 99, 100, 96

(56) References Cited

U.S. PATENT DOCUMENTS 5,553,675 A * 9/1996 Pitzen et al. ................. 173/217
5,792,573 A * 8/1998 Pitzen et al. ................... 429/97

* cited by examiner

*Primary Examiner*—Lawrence Luk
(74) *Attorney, Agent, or Firm*—Wood, Herron & Evans, L.L.P.

(57) ABSTRACT

An autoclavable battery for use with electrical equipment in operative procedures includes a series of electrochemical cells surrounded by insulation and hermetically sealed in a battery case. The insulation has a thickness and thermal conductivity effective to prevent the cells from reaching their venting temperature when subjected to autoclave conditions.

10 Claims, 1 Drawing Sheet

AUTOCLAVABLE BATTERY PACK

RELATED APPLICATIONS

This application is related to provisional application Serial No. 60/397,292 entitled AUTOCLAVABLE BATTERY CELL filed Jul. 19, 2002.

BACKGROUND

Surgeons frequently use a variety of different power tools during operative procedures. As with any surgical instruments, these tools must be sterilized prior to use. Generally these have been pneumatically powered or powered by AC current. This is problematic in that the air hose or power cord can interfere with operative procedures.

Over recent years more and more battery powered equipment has been developed. Battery cells, particularly lithium ion cells, and nickel cadmium cells provide sufficient power and are easily charged permitting them to be used with most electrical equipment. To be used with surgical equipment, the battery must be autoclavable. Typically lithium ion cells will vent out and be destroyed at about 80° C. For maximum life, it is desirable to keep the temperature of lithium or Ni/Cd cells to less than 60° C. Sterilization requires autoclaving typically at 136° C. for four minutes to meet U.S. regulations or ten minutes to meet European regulations. Thus, this has limited the use of batteries for surgical instruments.

Another major concern is safety. Since autoclaves can run for 40 minutes, it is imperative that the cells not rupture or explode if they are inadvertently autoclaved for 40 minutes.

SUMMARY OF THE INVENTION

The present invention is premised on the realization that an autoclavable battery pack can be formed by providing a sealed battery case incorporating a plurality of cells. Separating the cells from the battery case is an insulating material that provides effective insulation to prevent the cells from reaching 80° C. (preferably less than 60° C.) during autoclave conditions. Typically the insulation should be one which has a thermal conductivity of 0.02 kilocalories per hour at 136° C. or less. In a preferred embodiment, the insulation is expanded silica thermal insulation such as Microtherm HF™ quilted insulator. In an optimum situation, sufficient insulation is employed to prevent the cell temperature from reaching 80° C. when autoclaved for forty minutes at 136° C.

The objects and advantages of the present invention will be further appreciated in light of the followed detailed description and drawings in which:

DETAILED DESCRIPTION

Figure 1:
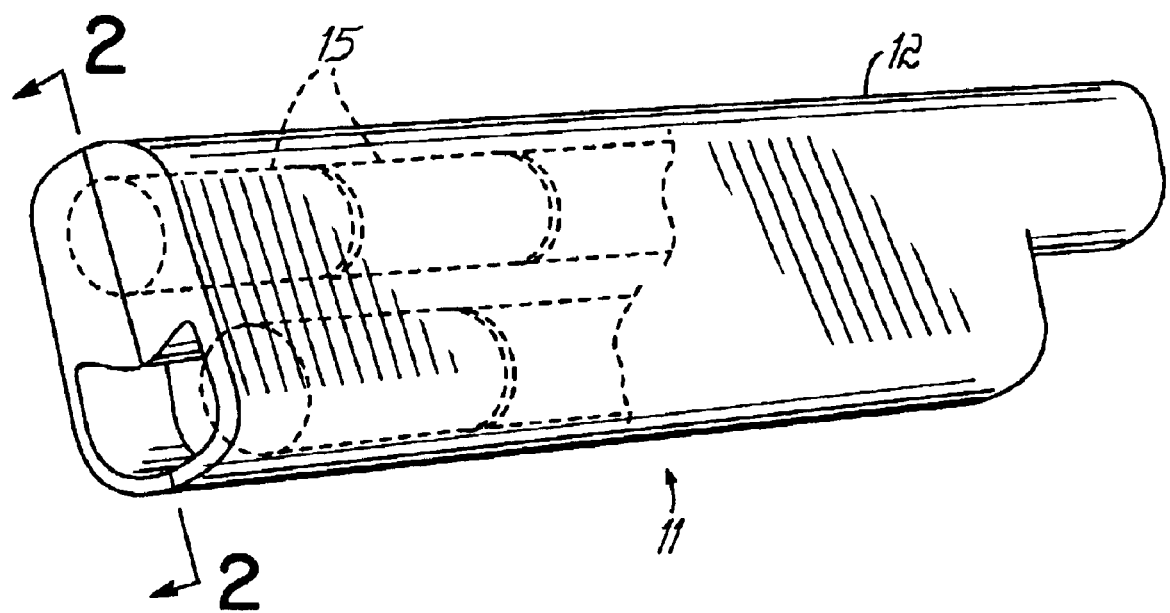
FIG. 1 is a diagrammatic perspective view of a battery pack for use in the present invention.
Figure 2:
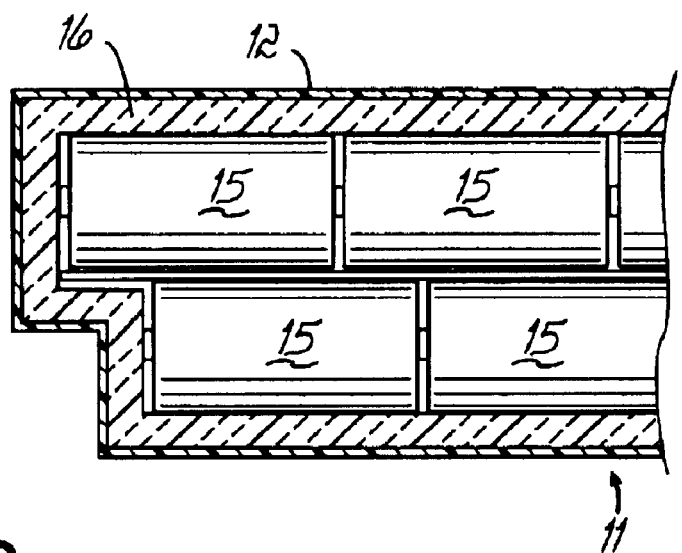
FIG. 2 is a cross-sectional view taken along line 2—2 of the battery pack shown in FIG. 1 partially broken away.

The battery pack 11 of the present invention comprises a hermetically sealed case 12 with negative and positive contacts (not shown) that provide an electrical path into the interior of the battery case while at the same time maintaining a hermetically sealed interior. Inside the battery case 12 are a plurality of cells 15. The cells 15 as shown are connected in series. Although if desired, they can be connected in parallel or series/parallel combinations. Surrounding the cells is an insulating material 16 which completely encases the cells and permits for passage of the leads from the cells to the electrodes.

The cells can be any rechargeable electrochemical cell such as lithium ion, Ni/Cd as well as NiMH or lithium polymer. If these cells are maintained at less than 60° C., they will not be damaged.

The insulating material used in the present invention must at a minimum prevent any of the cells from reaching 80° C. while being exposed to 136° C. for four minutes and preferably at least ten minutes. Preferably the insulation will prevent the cells from reaching even 60° C. during a four minute or 10 minute autoclave. In order to achieve this, sufficient insulation is employed to prevent heat transfer to the cells during autoclaving.

For design purposes, it is preferable to have as little insulation as possible to reduce the size and weight of the battery pack. Overall the insulation required will generally have a thermal conductivity of about 0.2 to 0.15 or less kilocalorie per hour measured at 200° C. Thus, the heat transfer at 136° C. will be slightly less than this, approximately 0.02 kilocalories per hour less than that measured at 200° C. More preferred, the thermal conductivity of the insulation surrounding the cells shall be less than 0.1 kilocalories per hour measured at 200° C. Additional insulation can be provided to keep the cells from reaching 80° C. if autoclaved for 40 minutes at 136° C.

One preferred material for use in the present invention is manufactured by Microtherm, Inc. of Rockford, Tenn. The product Microtherm HF Quilted Panel which has a thickness of 0.125 inches and a density of 16.5 lbs. per cubic foot provides an excellent insulator. This is a cross-stitched quilted panel formed from microporous silica. Preferably 0.4 inches of this material would be used to provide maximum protection. Other suitable insulators which may be used in the present invention include Min-k, vacuum foil and other alumina based insulators. The insulation as shown is wrapped around all of the cells together. Alternately each cell can be individually wrapped with insulation.

The outer case of the battery pack is sealed preferably hermetically sealed and provides positive and negative leads adapted to connect to a power tool. Thus, the battery pack of the present invention can be used, recharged and autoclaved at 136° C. for up to ten minutes or more without allowing the internal temperature of the cells to reach 80° C. thereby preventing the destruction of the cells during autoclaving and permitting repeated use.

This has been a description of the present invention and the preferred mode of practicing the invention, however, the invention itself should only be defined by the appended claims wherein we claim.

I claim:

1. An autoclavable battery pack comprising at least one electrochemical cell sealed in a battery case having a positive and negative electrode;

said cell surrounded by insulation having a thermal conductivity and thickness effective to prevent said cell from reaching 80° C. when said battery pack is subjected to 136° C. temperature for four minutes.

2. The battery pack claimed in claim 1 comprising a plurality of cells wherein all of said cells are surrounded by said insulation.

3. The battery pack claimed in claim 2 wherein said insulation comprises an effective thickness of a microporous silicate insulation.

4. The battery pack claimed in claim 3 wherein said microporous silicate insulation has a thermal conductivity of 0.21 kilocalories per hour at 200° C. or less.

5. The battery pack claimed in claim 3 wherein said insulation has a thickness of about 0.4 inches surrounding said cells.

6. The battery pack claimed in claim 2 wherein said cells are lithium ion cells.

7. The battery pack claimed in claim 2 wherein said cells are Ni/Cd cells.

8. The battery pack claimed in claim 2 wherein said cells are NiMH cells.

9. The battery pack claimed in claim 7 wherein said cells are lithium polymer cells.

10. An autoclavable lithium ion cell comprising a lithium cell surrounded by insulation having effective thermal conductivity and thickness to prevent said lithium ion cell from reaching 80° C. when subjected to 136° C. temperature for ten minutes.

* * * * *